(12) United States Patent
Carew et al.

(10) Patent No.: US 7,849,886 B2
(45) Date of Patent: *Dec. 14, 2010

(54) UNIFIED CONDUIT ARRAY

(75) Inventors: Gregory T. Carew, Tomahawk, WI (US); Matthew J. Kusz, Minneapolis, MN (US)

(73) Assignee: J. G. Starew Innovative Solutions, L.L.C., Tomahawk, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/612,388

(22) Filed: Nov. 4, 2009

(65) Prior Publication Data

US 2010/0043904 A1 Feb. 25, 2010

Related U.S. Application Data

(63) Continuation of application No. 12/145,919, filed on Jun. 25, 2008, now Pat. No. 7,635,009.

(51) Int. Cl.
*F16L 11/00* (2006.01)

(52) U.S. Cl. .................. 138/115; 138/116; 138/114; 138/110

(58) Field of Classification Search ......... 138/115–117, 138/110; 174/95, 97, 68.3
See application file for complete search history.

(56) References Cited

U.S. PATENT DOCUMENTS

| | | | |
|---|---|---|---|
| 1,749,725 A | 3/1924 | Uhl et al. |
| 2,372,674 A | 2/1943 | Jordan |
| 3,870,346 A | 3/1975 | Kappeler et al. |
| 4,121,653 A | 10/1978 | Vinz |
| 4,582,093 A | 4/1986 | Hubbard et al. |
| 4,614,838 A | 9/1986 | Sandstrom |
| 4,899,965 A | 2/1990 | Usui |
| 5,029,817 A | 7/1991 | Tamm |
| 5,036,891 A | 8/1991 | Vogelsang |
| 5,069,254 A | 12/1991 | Vogelsang |
| 5,131,458 A | 7/1992 | Bourne et al. |
| 5,236,016 A | 8/1993 | Vogelsang |
| 5,249,764 A | 10/1993 | Narumi |
| D346,546 S | 5/1994 | Tesmar, Jr. |
| 5,339,866 A | 8/1994 | Holt |
| 5,399,812 A | 3/1995 | Woszczyna et al. |

(Continued)

FOREIGN PATENT DOCUMENTS

JP         63112027 A        5/1988

(Continued)

OTHER PUBLICATIONS

PEX-Pal In-floor Heating Organizer/Collector, Axiom Industries, 2007, http://www.pex-pal.com.

*Primary Examiner*—Patrick F Brinson
(74) *Attorney, Agent, or Firm*—Ziolkowski Patent Solutions Group, SC

(57) ABSTRACT

A conduit array configured to route in-floor tubing includes a plurality of elbow conduits. A webbing is positioned between each of the elbow conduits in the plurality of elbow conduits to connect the plurality of elbow conduits. The webbing is configured to allow for separation of at least one of the plurality of elbow conduits from the conduit array, thus allowing for the conduit array to be scaleable or sizeable.

17 Claims, 5 Drawing Sheets

U.S. PATENT DOCUMENTS

| | | |
|---|---|---|
| 5,533,355 A | 7/1996 | Rawlings |
| 5,598,682 A | 2/1997 | Haughian |
| 5,740,300 A | 4/1998 | Hodge |
| 5,819,374 A | 10/1998 | Chiles et al. |
| 6,009,612 A | 1/2000 | Fiedrich et al. |
| 6,248,952 B1 | 6/2001 | Reeves et al. |
| 6,250,591 B1 | 6/2001 | Cunningham |
| 6,352,224 B1 | 3/2002 | Collins |
| 6,527,302 B1 | 3/2003 | Gault et al. |
| 6,726,115 B1 | 4/2004 | Chiles et al. |
| 6,823,899 B2 | 11/2004 | Weibel et al. |
| 7,332,675 B2 | 2/2008 | Galasso |
| 2003/0021655 A1 | 1/2003 | Correll et al. |
| 2003/0172602 A1 | 9/2003 | DeFreitas |
| 2006/0037264 A1 | 2/2006 | Paetow et al. ............... 52/220.1 |
| 2006/0272243 A1 | 12/2006 | Carew et al. ................ 52/220.1 |

FOREIGN PATENT DOCUMENTS

| | | |
|---|---|---|
| JP | 04351398 A | 12/1992 |
| JP | 09137590 A | 5/1997 |
| JP | 09273665 A | 10/1997 |
| JP | 10141578 A | 5/1998 |
| JP | 2002235432 A | 8/2002 |
| JP | 2004245398 A | 9/2004 |
| WO | WO2004018921 A1 | 3/2004 |

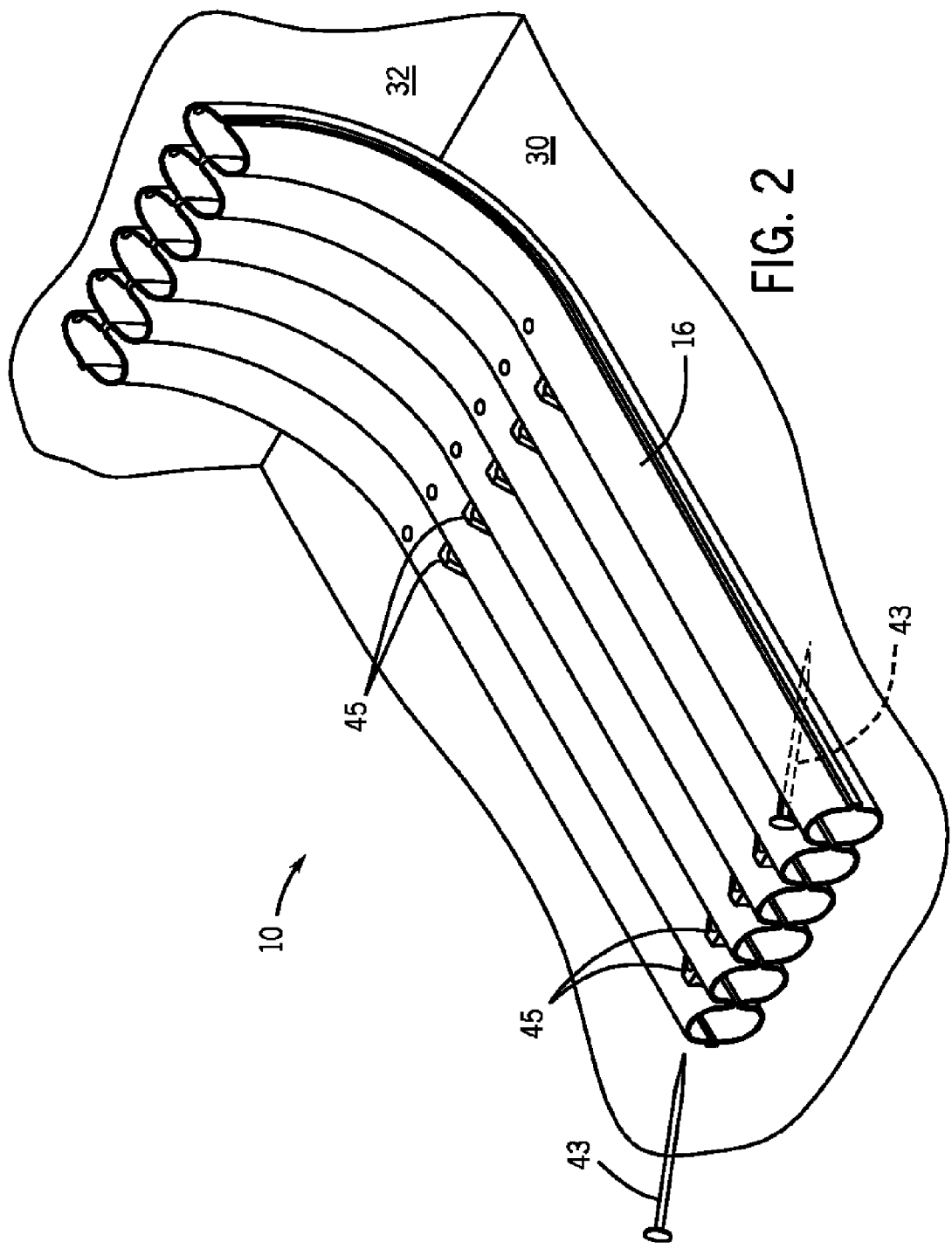

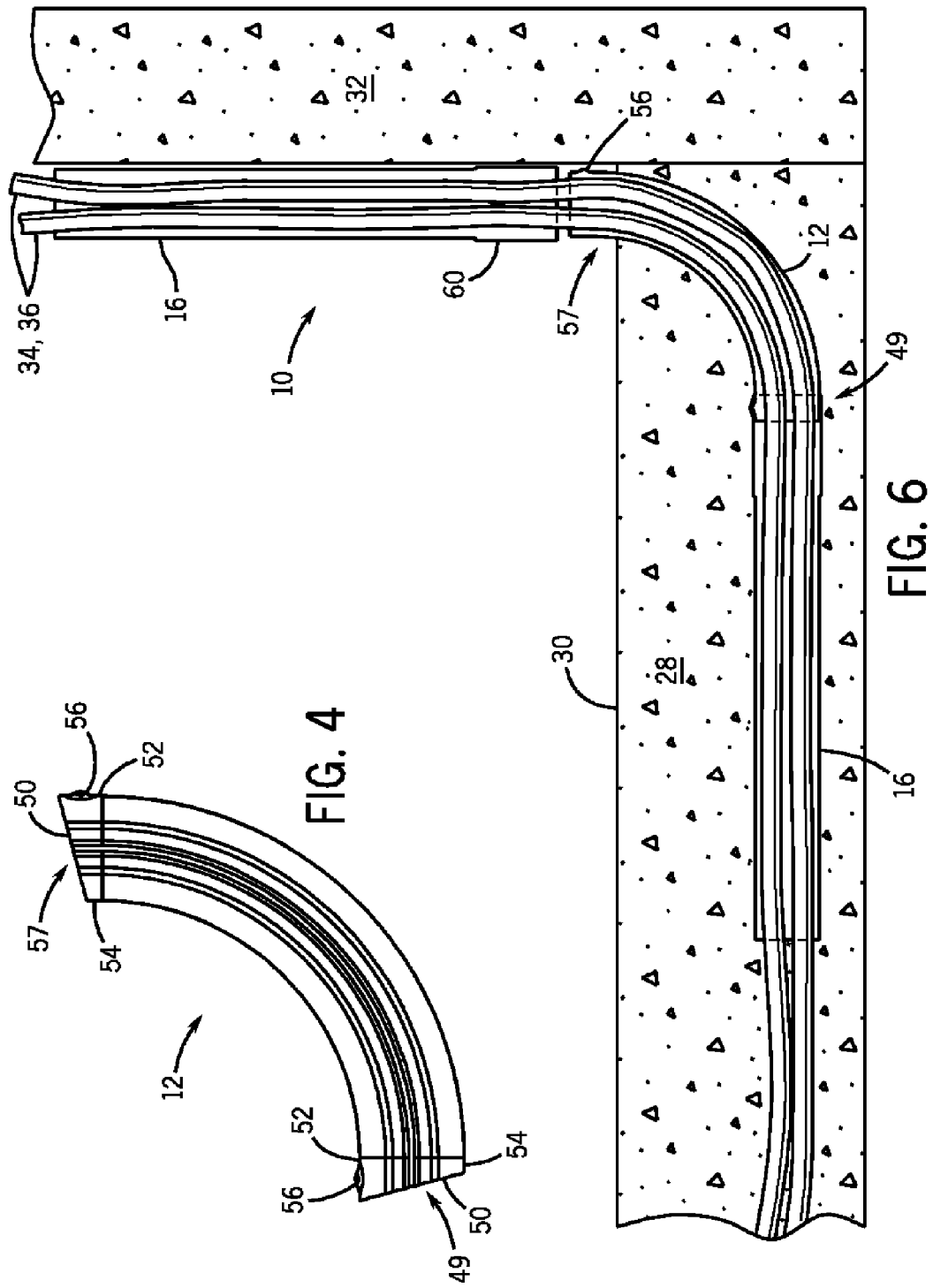

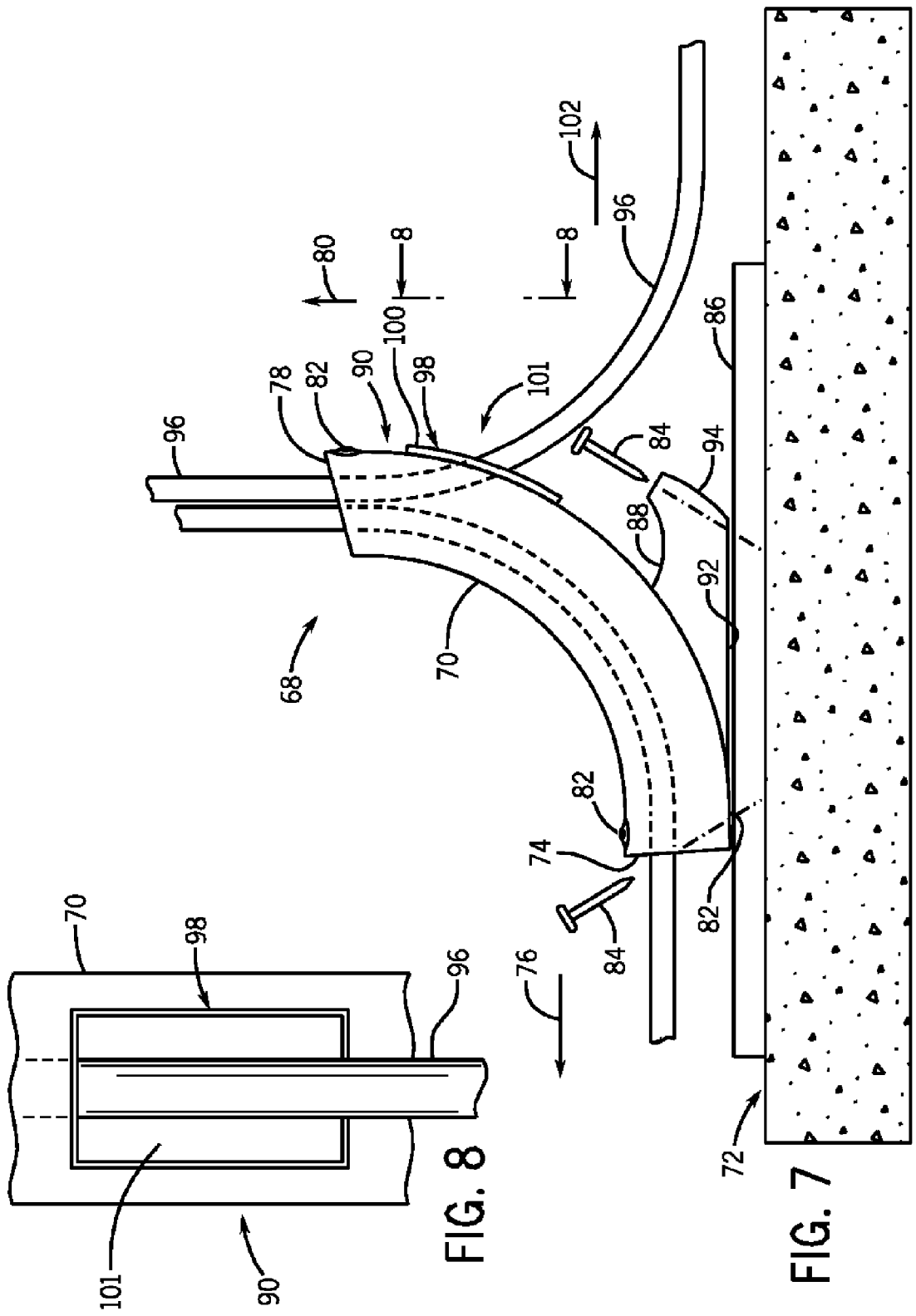

UNIFIED CONDUIT ARRAY

CROSS-REFERENCE TO RELATED APPLICATION

The present invention is a continuation of, and claims priority to, U.S. application Ser. No. 12/145,919, filed Jun. 25, 2008, the disclosure of which is incorporated herein by reference.

BACKGROUND OF THE INVENTION

The present invention relates generally to guide assemblies and, more particularly, to a guide assembly having a unified conduit array.

During construction of residential and commercial facilities, it is often required to pass conductors through the structure of the facility. Such conductors include power cables, water lines, phone cables, and television signal cables. Additionally, with the proliferation of "smart buildings" it has become more desirable and cost efficient to pass computer cables as well as entertainment and security cables within wall, floor, and ceiling cavities. Such systems are often referred to as structured wiring systems and often include a bundled array of phone, computer, co-axial, and speaker cables.

Often, the devices associated with a specific system share a common point of origin. For simplicity, only one such system will be described. In buildings equipped with radiant heat systems, a plurality of radiant heating loops are connected to a manifold and extend about the building. The simplest of radiant heating loops have a first end connected to a hot water inlet, extend about the area to be heated, and have a second end connected to a return manifold thereby forming a "loop." A heating fluid, such as water, is heated by a heat source, such as a water heater or boiler, and is pumped through the heating loop. Such radiant heating loops are frequently located in close proximity to a finish floor of the area to be heated. The heating loops can be positioned beneath a subfloor or sandwiched between a subfloor or substrate, and a finish floor.

To maximize the usable space of a structure, the heating loops often extend generally transverse to the floor surfaces in close proximity to a wall surface. Such an orientation minimizes the space obstructed by the heating tubes. Often, an elbow is employed to facilitate this generally transverse directional change. For radiant heat systems, each end of a loop must be threaded through an elbow. A single loop heating system requires an elbow to be passed over each end of the heating tube. Each elbow must then be securely fastened to a sub-surface to allow a finish floor to be formed thereabout. Individually securing each elbow is a time consuming and tedious process and often delays the construction process. Although there are known elbow constructions that allow the tube to pass radially into the elbow, these elbows only support individual tubes. That is, often multiple elbows must be individually secured and individual conductors passed therethrough or thereinto. Additionally, depending on the finish floor system formed about the heating tubes, inadvertent movement of the individual elbows can result in damage or displacement of the conductor passed therethrough during formation of the finish floor.

It would therefore be desirable to have a system and method capable of quickly and efficiently guiding and securing a plurality of tubes or conductors in such applications.

BRIEF DESCRIPTION OF THE INVENTION

The invention provides a system and method that solves the aforementioned drawbacks. Specifically, a system for arranging a plurality of conductors includes a unified conduit array. The unified conduit array includes a plurality of conduits therein, each of the plurality of conduits constructed to direct the passage of multiple tubes and/or conductors therethrough. The individual tubes/conductors communicate any one of a fluid, an electrical power, a hydraulic fluid, or the like through the unified conduit array.

In accordance with one aspect of the invention, a conduit array includes a plurality of elbow conduits configured to route in-floor tubing therethrough. The conduit array also includes a webbing connecting the plurality of elbow conduits and positioned between each of the elbow conduits in the plurality of elbow conduits, wherein the webbing is configured to allow separation of at least one of the plurality of elbow conduits from the conduit array.

In accordance with another aspect of the invention, a conductor guide assembly includes an elbow guide array configured to route in-floor tubing therethrough, the elbow guide array having a plurality of elbow guides. Each of the plurality of elbow guides further includes an angled first end facing in a first direction, an angled second end facing in another direction relative to the first end, and a dimple formed on each of the angled first end and the angled second end.

In accordance with a further aspect of the invention, a unified hydronic junction includes a plurality of guide sleeves, each of the plurality of guide sleeves sized to fit a plurality of tubes therein. The unified hydronic junction also includes a webbing positioned between each of the plurality of guide sleeves to connect the plurality of guide sleeves, the webbing configured to allow for selective removal of an individual guide sleeve from the plurality of guide sleeves.

Various other features, objects and advantages of the invention will be made apparent from the following detailed description and the drawings.

BRIEF DESCRIPTION OF THE DRAWINGS

The drawings illustrate preferred embodiments presently contemplated for carrying out the invention.

In the drawings:

FIG. 2 is a perspective view of a guide assembly according to another embodiment of the invention.

FIG. 4 is a side view of an elbow conduit according to an embodiment of the invention.

FIG. 6 is a cross-sectional view of another embodiment of the guide assembly according to the invention secured in a substrate.

FIG. 7 is a cross-sectional view of another embodiment of the guide assembly according to the invention secured in a substrate.

FIG. 8 is a cross-sectional view of an elbow conduit taken along line 8-8 of FIG. 7.

DETAILED DESCRIPTION OF THE PREFERRED EMBODIMENT

Figure 1:
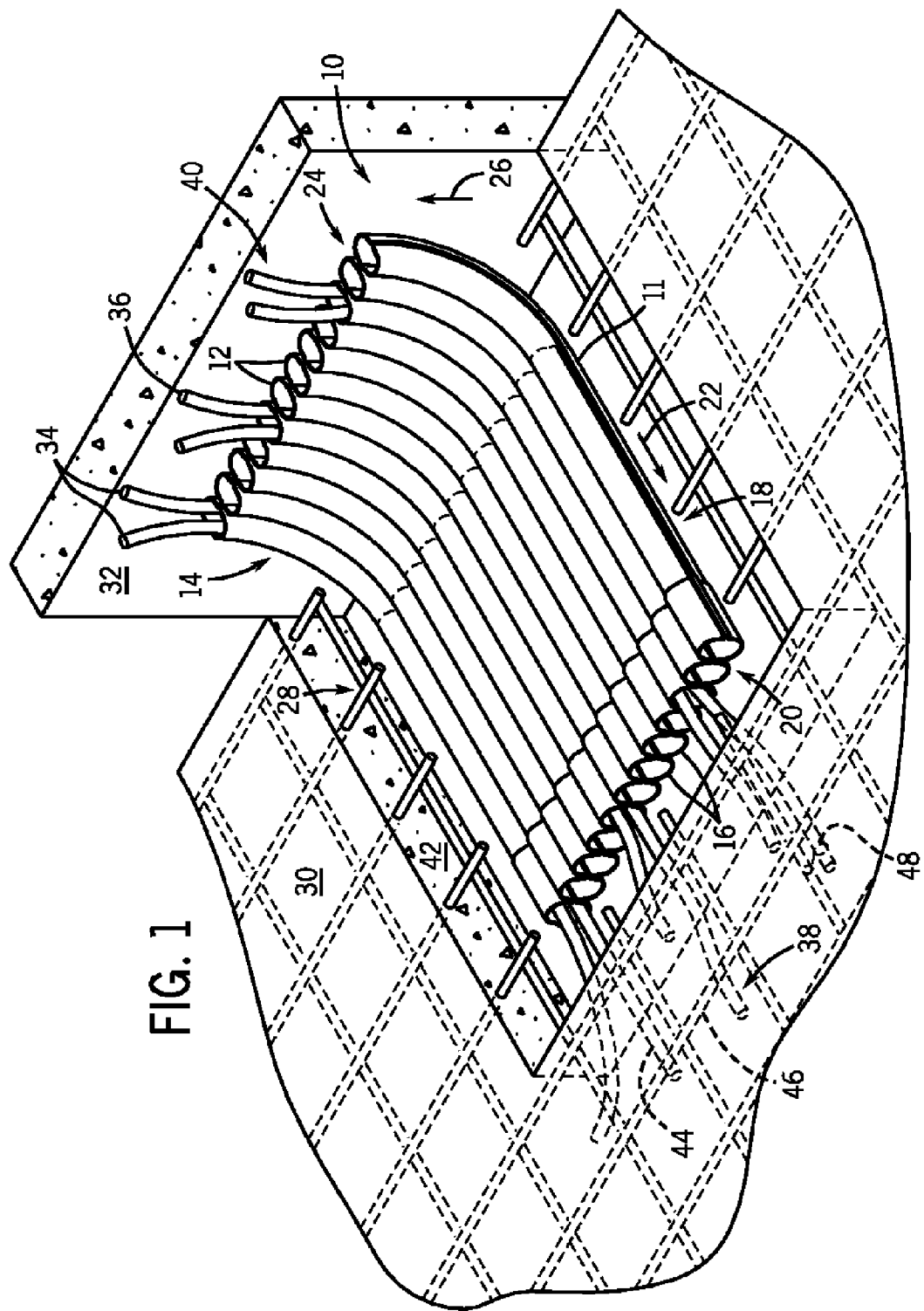
FIG. 1 is a perspective view of one embodiment of a guide assembly according to the invention secured in a substrate.

FIG. 1 shows one embodiment of a guide assembly 10 (i.e., conduit array, unified hydronic junction) according to the present invention. In the embodiment of FIG. 1, guide assembly 10 is formed from a plurality of guide conduits or sleeves 11 that are joined together. Each of the guide conduits 11 further includes and is comprised of a plurality of elbow conduits 12 (i.e., elbow guides) that form an elbow guide array 14 and a plurality of extension conduits 16 (i.e., connector guides/conduits) that form an extension guide array 18. As shown in FIG. 1, each of the elbow conduits 12 and extension conduits 16 can be formed as an integral guide conduit 11; however, as will be explained in greater detail below, the elbow conduits 12 and extension conduits 16 can also be separate components.

Each guide conduit 11 includes a first end 20 that extends in a first direction, indicated by arrow 22, and a second end 24 that extends in a second direction, indicated by arrow 26. First direction 22 is oriented to generally align with a floor system 28 and second direction 26 extends outwardly therefrom. Although first direction 22 and second direction 26 are shown as generally transverse to one another, other crossing orientations are envisioned and within the scope of the appending claims. First ends 20 are generally aligned to share a common plane preferably below a finish surface 30 of floor system 28. Second ends 24 are also generally aligned to share a common plane preferably extending along a wall 32.

Prior to forming floor system 28 about guide assembly 10, a plurality of conductors 34 is passed through guide conduits 11. The plurality of conductors 34 are any of a radiant heating tube, an electrical cable, a computer cable, a potable water tube, a structured wiring cable, a computer cable, a phone cable, or any other conductor that is desired to be passed through floor system 28. As shown in FIG. 1, each guide conduit 11 is configured to allow for passage therethrough of a plurality of conductors 34. In one embodiment, guide conduits 11 are elliptical in shape and are sized so as allow for a pair of ¾" radiant heating tubes 36 (e.g., PEX tubes) to be routed therethrough.

A first end 38 of each conductor 34 extends from first end 20 of guide conduit 11 to pass through floor system 28. As shown in FIG. 1, first ends 20 of guide conduits 11 share a common plane generally parallel to a floor surface. Such a construction ensures that conductors 34 passed from first ends 20 of guide assembly 10 are a relatively uniform depth in flooring system 28. For heating type systems, this ensures relatively uniform heating of the floor surface. First end 38 of each conductor 34 can exit floor system 28 at a location remote from guide assembly 10 or loop through floor system 28 and return to guide assembly 10 and exit floor system 28 thereat. That is, where conductor 34 is a radiant heating tube 36 connected to a heat source (not shown) with an intended return site located proximate guide assembly 10, radiant heat tube 36 could enter and exit floor system 28 via guide assembly 10. Comparatively, if conductor 34 is an electrical cable desired to feed a device such as an outlet, electrical cable does not need to exit floor system 28 at guide assembly 10.

A second end 40 of each conductor 34 extends from second end 24 of a respective guide conduit 11 for connection with an associated system. That is, second end 40 of radiant heat tube 36 extends from second end 24 of guide conduit 11 for connection to a heating system (not shown), such as a heating manifold. Once the desired conductors 34 have been passed through guide assembly 10, floor system 28 is formed thereabout. For concrete flooring systems 42, first ends 38 of plurality of conductors 34 are secured about a length 44 of the conductor 34 to a reinforcing material 46 associated with the concrete flooring system 42. A plurality of ties 48 secure conductors 34 to reinforcing material 46 in a desired location such that conductors 34 remain in the desired location during the process of forming floor system 28 thereabout. Alternatively, conductors 34 could be secured directly to a subfloor, substrate, or graded surface.

Understandably, floor system 28, being a concrete floor system, is merely an exemplary application of guide assembly 10. That is, guide assembly 10 is equally applicable with other flooring systems such as wood/tile/carpet flooring systems. Additionally, the orientation of guide assembly 10 to floor system 28 is also exemplary. That is, as shown in FIG. 1, second ends 24 of guide assembly 10 extend upwardly from finish floor 30. Where passage of conductors 34 through a first floor flooring system is desired, guide assembly 10 is rotatable 180 degrees to allow the conductors that are passed therethrough to extend into a joist cavity below the first floor flooring system. As such, guide assembly 10 is applicable to multiple levels of a building structure and provides an efficient and convenient method of passing multiple conductors into and out of any flooring system. It is further recognized that guide assembly 10 can be used for purposes of guides conductors 34 along a ceiling and that the assembly can be secured to a ceiling joist for example, as will be explained in greater detail below.

As shown in FIG. 2, in one embodiment of the invention, guide assembly 10 can be secured to floor system 28 by way of one or more spikes 43. To aid in the securing of guide assembly 10 to floor system 28 via spikes 43, spike guides 45 are formed into guide assembly 10. More specifically, spike guides 45 are formed in guide assembly 10 between extension conduits 16 and are formed at an angle to allow for spikes 43 to be inserted therein. Force can be applied to spikes 43 such that the spikes are translated down along spike guide 45, down through between extension conduits 16, and into floor system 28 so as to secure guide assembly 10 thereto.

Figure 3:
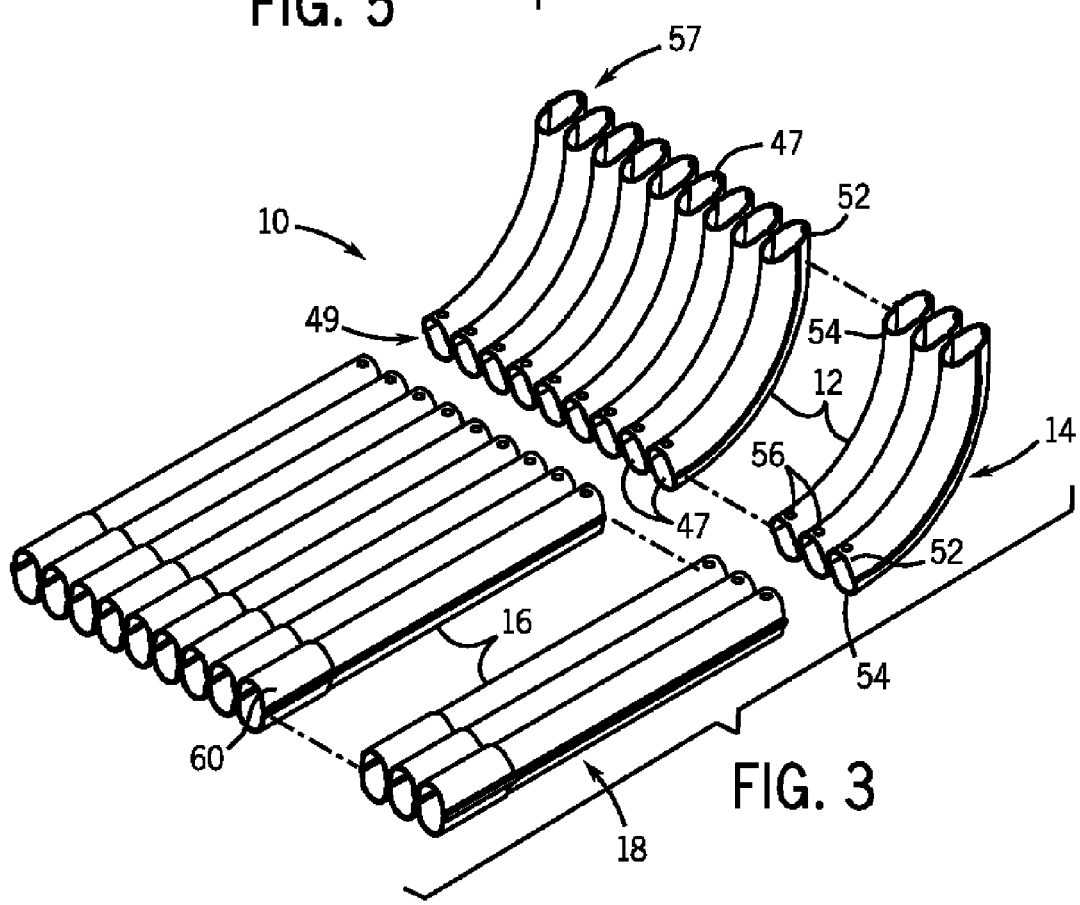
FIG. 3 is a perspective view of a guide assembly according to another embodiment of the invention.

Referring now to FIG. 3, guide assembly 10 is shown removed from flooring system 28 and as separated into an elbow conduit array 14 and an extension conduit array 18. Elbow conduits 12 are shown removed from extension conduits 16 such that the configuration of each component can be seen. Elbow conduit 12 can be separated from extension conduit 16 by way of a cut or can be formed separately therefrom. As shown in FIG. 3, elbow conduit 12 is cut from extension conduit 16 such that end faces 47 of the elbow conduit 12 are straight. Referring now to FIG. 4, and as shown therein, it is envisioned that upon separation of elbow conduit 12 from extension conduit 16 (or upon a separate forming of elbow conduit 12), angled end surfaces 50 of elbow conduit 12 can be formed by way of an angled cut. That is, a first end 49 and second end 57 of elbow conduit 12 can be cut to include an angled end surface 50 thereon. As shown in FIG. 4, angled end surface 50 on first end 49 is formed such that a portion on a high side 52 of the first end 49 extends out further than a low side 54. Formed on the high side 52 of first end 20 is a dimple 56 (i.e., nipple) which allows for attachment of elbow conduit 12 to another member or surface. An angled end surface 50 is also formed on second end 57 of elbow conduit 12 such that a portion on a high side 52 of second end 57 extends out further than a low side 54. Formed on the high side 52 of second end 57 is a dimple 56 (i.e., nipple) which allows for attachment of elbow conduit 12 to another member or surface. The angled surface 50 at first end 49 and second end 57 are at opposing angles, such that the orientation of elbow conduit 12 can be changed for positioning the dimples 56 at varying positions. That is, dimples 56 can be positioned such that one is facing upwards and away from a flooring system 28 (shown in FIG. 1) and the other is facing inwards toward a wall 32 (shown in FIG. 1). Alternatively, if the orientation of elbow conduit 12 were reversed, dimples 56 could be positioned to face downward and towards the flooring system and outward from the wall.

By selectably orienting elbow conduit 12, the position of dimples 56 can be controlled to affix elbow conduit 12 to joists or studs in the flooring system and the wall. Dimples 56 are configured to receive screws therein and provide a secure connection between elbow conduit 12 and the joists and/or studs. For accommodating insertion of a screw into dimple 56, angled end surface 50 is formed at a large enough angle such that the distance between high end 52 and low end 54 is greater than the diameter of the screw. Thus, it is envisioned that angled end surface 50 be formed at approximately 15 degrees or greater.

Referring again to FIG. 3, dimples 56 are configured to also allow for secured attachment of extension conduits 16 to elbow conduits 12. As shown in FIG. 2, extension conduit 16 includes a flared-out end portion 60 thereon. The flared-out end portion 60 is configured to fit over and around either of the first end 49 and the second end 57 of the elbow conduit 12. More specifically, flared-out end portion 60 connects with elbow conduit 12, and dimple 56 on either the first or second end 49, 57 of elbow conduit 12, to form a press or interference fit therebetween. This provides a secure connection between extension conduit 16 and elbow conduit 12.

Figure 5:
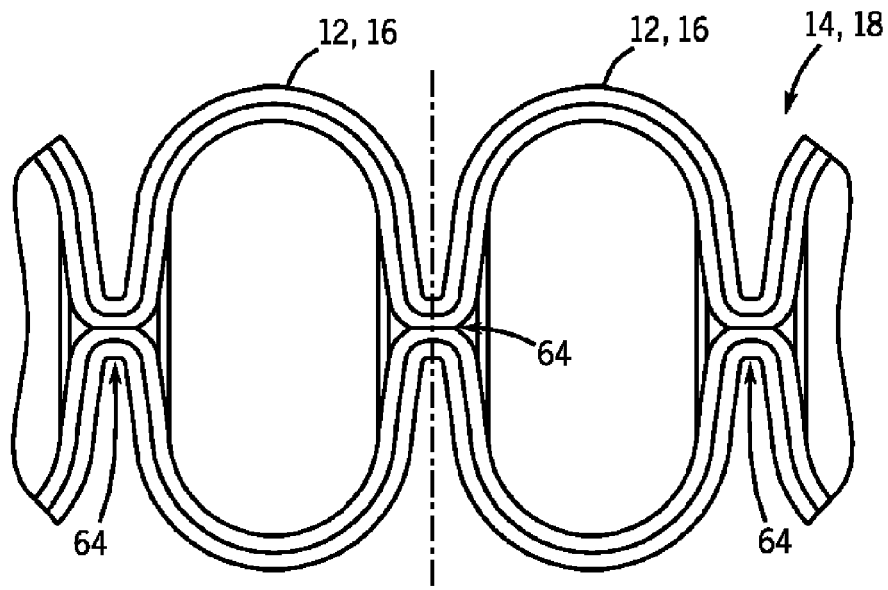
FIG. 5 is a detailed view of a webbing formed between conduits in the guide assembly.

Elbow guide array 14 and extension guide array 18 are further configured so as to be scaleable or sizeable. That is, individual elbow conduits 12 and extension conduits 16 can be removed by a user as desired. Each of the elbow guides 12 in elbow guide array 14 is connected by a webbing 64 to another of the elbow guides 12, as is shown in FIG. 5. The webbing 64 is comprised of the same polyethylene material as elbow guide 12 and is formed during a molding process of elbow guide array 14. As shown in detail in FIG. 5, webbing 64 forms a thin strip or piece of material between individual elbow guides 12 and is constructed such that an elbow conduit 12 can be broken off from the array 14 upon application of a cut to webbing 64 by a user. A similar webbing 64 is also formed between each of the extension conduits 16 in the extension conduit array 18, such that individual extension conduits 16 can be removed from the extension conduit array 18.

Referring now to FIG. 6, a cross-sectional view of guide assembly 10 is shown. As shown in FIG. 6, second end 57 of elbow conduit 12 extends outwardly from finish surface 30 of floor system 28. A vertically oriented extension conduit 16 is positioned above second end 57 of elbow conduit 12 and can be mated with elbow conduit 12 as desired by a user by way of flared-out end portion 60. The vertically oriented extension conduit 16 extends outwardly from a surface 30 of flooring system 28 and functions to keep a conductor 34, such as PEX tubing 36, from curling or bending downwards. Prevention of curling/bending of tubing 36 prevents the tubing from interfering with construction of the flooring system 28, such as when concrete is being poured.

Referring still to FIG. 6, an additional extension conduit 16 is also formed or mated to first end 49 of elbow conduit 12 and extends horizontally therefrom. The horizontally oriented extension conduit 16 extends parallel to floor system 28 and can be used to secure guide assembly 10 thereto. That is, guide assembly 10 can be secured to floor system 28 by way of spikes 43 that are secured in spike guides 45 (see FIG. 2) formed between individual extension conduits 16 and pounded into the flooring system. It is also envisioned that guide assembly 10 could be secured to wall 32 by way of spikes 43 guided through spike guides 45 in the vertically oriented extension conduit 16.

Referring now to FIG. 7, according to another embodiment of the invention, an elbow conduit array 68 formed of a plurality of elbow conduits 70 is shown secured in floor system 72. Elbow conduits 70 include a first end 74 facing in a first direction 76 and a second end 78 facing in a second direction 80. One or more dimples 82 are formed at each end 74, 78 of elbow conduit 70 that are configured to receive a screw 84 therein to secure the elbow conduit 70 to the flooring system 28 and/or a wall system (not shown). In one embodiment, elbow conduit 70 can be secured to a base 86 in flooring system 72, such as a ½" plywood sheet laid over a gravel foundation, by way of screws 84 positioned at nipple 82. To further secure elbow conduit 70 to base 86, a support member 88 is included on at least one elbow conduit 70 in elbow conduit array 68, and in an exemplary embodiment, is included on each elbow conduit 70. As shown in FIG. 7, the support member 88 extends out in a horizontal direction from first end 74 of the elbow conduit 70 and towards the radiused portion 90 of the elbow conduit. The support member 88 has a linear bottom surface 92 that rests on base 86 in the flooring system 72 and includes a screw guide 94 therein to guide a screw 84 therethrough. A screw 84 can be inserted into screw guide 94 to further secure elbow conduit 70 and the elbow conduit array 68 to the base 86.

As further shown in FIG. 7, tubing and/or conductors 96 are routed through elbow conduits 70 in the elbow conduit array 68 so as to exit the elbow conduit 70 at the first and second ends 74, 78 thereof. To allow for further flexibility in routing tubes/conductors 96 therethrough, elbow conduits 70 also include a separate, tertiary insertion point 98 generally positioned in radiused portion 90 of elbow conduit. The insertion point 98 is positioned in the radiused portion 90 on a surface that faces generally downward (i.e., toward base 86). In an exemplary embodiment, insertion point 98 comprises a raised area 100 on a surface of the elbow conduit 70. The raised area 100 outlines a desired cutting pattern that a user may cut along to form an opening 101 in elbow conduit 70. The opening 101 formed in the elbow conduit 70, shown in FIG. 8, would thus allow for a tube/conductor 96 to be routed therethrough from another direction (i.e., a third direction 102), which as shown in FIG. 7, may be a direction opposite from the first direction 76. In another embodiment, insertion point 98 comprises an opening 101 pre-formed in the elbow conduit 70, such that a tube/conductor 96 from another direction 102 can be routed through elbow conduit 70 without the need for a user to perform a separate cut to form the opening 101.

Although guide assembly 10 is shown in FIGS. 1-3 as being comprised of twelve elbow conduits 12 and extension conduits 16, understandably other numbers of conduits are envisioned and within the scope of the claims. That is, guide assembly 10 could be constructed to have any number of elbow/extension conduits. Additionally, and as stated above, individual conduits 12, 16 can be removed from the array of conduits to scale the size of the guide assembly 10 to include a desired number of conduits for application specific uses. Such a system is highly versatile and limits waste by providing a guide assembly 10 having a desired number of conduits.

Therefore, according to one embodiment of the invention, a conduit array includes a plurality of elbow conduits configured to route in-floor tubing therethrough. The conduit array also includes webbing connecting the plurality of elbow conduits and positioned between each of the elbow conduits in the plurality of elbow conduits, wherein the webbing is configured to allow separation of at least one of the plurality of elbow conduits from the conduit array.

According to another embodiment of the invention, a conductor guide assembly includes an elbow guide array configured to route in-floor tubing therethrough, the elbow guide array having a plurality of elbow guides. Each of the plurality of elbow guides further includes an angled first end facing in a first direction, an angled second end facing in another direction relative to the first end, and a dimple formed on each of the angled first end and the angled second end.

According to yet another embodiment of the invention, a unified hydronic junction includes a plurality of guide sleeves, each of the plurality of guide sleeves sized to fit a plurality of tubes therein. The unified hydronic junction also includes a webbing positioned between each of the plurality of guide sleeves to connect the plurality of guide sleeves, the webbing configured to allow for selective removal of an individual guide sleeve from the plurality of guide sleeves.

The invention has been described in terms of the preferred embodiment, and it is recognized that equivalents, alternatives, and modifications, aside from those expressly stated, are possible and within the scope of the appending claims.

What is claimed is:

1. A conduit array comprising:
    a plurality of elbow conduits configured to route conductors therethrough, wherein at least one of the plurality of elbow conduits further comprises a support member aligned parallel to a flooring system and configured to receive a screw therein to secure the conduit array to the flooring system; and
    a webbing connecting the plurality of elbow conduits and positioned between each of the elbow conduits in the plurality of elbow conduits, wherein the webbing is configured to allow separation of at least one of the plurality of elbow conduits from the conduit array.

2. The conduit array of claim 1 wherein each of the plurality of elbow conduits further comprises:
    a first end facing in a first direction;
    a second end facing in a crossing direction relative to the first end;
    a dimple formed on each of the first end and the second end; and
    an angled end surface formed at each of the first end and the second end.

3. The conduit array of claim 2 wherein the dimple extends outwardly from a surface of the elbow conduit and is configured to form an interference fit with an extension conduit positionable on the first and second ends of the elbow conduit.

4. The conduit array of claim 1 wherein the webbing is further configured to guide a cut therethrough for removal of individual elbow conduits from the plurality of elbow conduits.

5. The conduit array of claim 1 wherein the webbing comprises a strip of polyethylene material.

6. The conduit array of claim 1 wherein each of the plurality of elbow conduits is elliptically shaped.

7. The conduit array of claim 6 wherein the elliptically shaped elbow conduit is sized to receive a pair of ¾" diameter conductors therein.

8. A conductor guide assembly comprising:
    an elbow guide array configured to route in-floor conductors therethrough and including a plurality of elbow guides;
    wherein each of the plurality of elbow guides further comprises:
        an angled first end facing in a first direction;
        an angled second end facing in another direction relative to the first end; and
        a dimple formed on each of the angled first end and the angled second end.

9. The conductor guide assembly of claim 8 wherein each of the plurality of elbow guides further comprises a radiused portion between the first end and the second end.

10. The conductor guide assembly of claim 9 wherein the radiused portion includes a tertiary insertion point formed therein configured to receive at least one in-floor conductor.

11. The conductor guide assembly of claim 9 wherein at least one of the plurality of elbow guides further comprises a support member aligned parallel to a flooring system and extending from the first end toward the radiused portion, the support member configured to receive a screw therein to secure the elbow guide array to the flooring system.

12. The conductor guide assembly of claim 8 further comprising a spike guide positioned between each of the plurality of elbow guides, the spike guide configured to receive a spike therein to affix the conductor guide assembly to a truss, joist, or stud.

13. The conductor guide assembly of claim 8 wherein each of the angled first end and the angled second end comprise an end surface that is angled at approximately 15 degrees, and wherein the angled first end and the angled second end are angled opposingly to one another.

14. A unified hydronic junction comprising:
    a plurality of guide sleeves, each of the plurality of guide sleeves sized to fit a plurality of tubes therein, wherein at least one of the plurality of guide sleeves further comprises a support member aligned parallel to a flooring system and configured to receive a screw therein to secure the unified hydronic junction to the flooring system; and
    a webbing positioned between each of the plurality of guide sleeves to connect the plurality of guide sleeves, the webbing configured to allow for selective removal of an individual guide sleeve from the plurality of guide sleeves.

15. The unified hydronic junction of claim 14 wherein the webbing comprises a strip of polyethylene material, the strip of polyethylene material having a thickness to allow for a cut to made therethrough for removal of individual guide sleeves from the unified hydronic junction.

16. The unified hydronic junction of claim 14 wherein each of the plurality of guide sleeves comprises:
    a first end facing in a first direction; and
    a second end facing in another direction relative to the first end.

17. The unified hydronic junction of claim 14 wherein the plurality of tubes comprises a water supply tube and a water return tube.

* * * * *